United States Patent
Hook

(10) Patent No.: US 9,344,786 B2
(45) Date of Patent: May 17, 2016

(54) VEHICLE WITH A MULTILAYER ROOF STRUCTURE AND A MICROPHONE UNIT INTEGRATED INTO THE ROOF STRUCTURE

(71) Applicant: Peiker Acustic GmbH & Co. KG, Friedrichsdorf (DE)

(72) Inventor: Brandon Hook, Grand Blanc, MI (US)

(73) Assignee: Peiker Acustic GmbH & Co. KG, Friedrichsdorf (DE)

( * ) Notice: Subject to any disclaimer, the term of this patent is extended or adjusted under 35 U.S.C. 154(b) by 498 days.

(21) Appl. No.: 13/761,590

(22) Filed: Feb. 7, 2013

(65) Prior Publication Data

US 2013/0208913 A1 Aug. 15, 2013

Related U.S. Application Data

(60) Provisional application No. 61/596,840, filed on Feb. 9, 2012.

(30) Foreign Application Priority Data

Feb. 9, 2012 (DE) .......................... 10 2012 002 414

(51) Int. Cl.
*H04R 1/02* (2006.01)
*H04R 1/08* (2006.01)
*B60R 11/02* (2006.01)
*B60R 11/00* (2006.01)

(52) U.S. Cl.
CPC ............ *H04R 1/028* (2013.01); *B60R 11/0247* (2013.01); *H04R 1/086* (2013.01); *B60R 2011/0028* (2013.01); *H04R 2499/13* (2013.01)

(58) Field of Classification Search
CPC .... H04R 1/028; H04R 1/086; H04R 2499/13; B60R 2011/0028; B60R 11/0247
USPC ........... 381/86, 389, 355, 359, 360, 361, 365, 381/366, 367, 395
See application file for complete search history.

(56) References Cited

U.S. PATENT DOCUMENTS

2002/0076076 A1* 6/2002 Kay et al. ....................... 381/355
2004/0204167 A1* 10/2004 Lane ............................ 455/569.1
2006/0158489 A1* 7/2006 Bibl et al. ......................... 347/86
2012/0213399 A1* 8/2012 Li et al. .......................... 381/365

FOREIGN PATENT DOCUMENTS

DE    10 2004 019 827 A1    9/2005

* cited by examiner

*Primary Examiner* — Ahmad F Matar
*Assistant Examiner* — Katherine Faley
(74) *Attorney, Agent, or Firm* — Burr & Brown, PLLC

(57) ABSTRACT

The invention relates to a vehicle having a multilayer roof structure and a microphone unit integrated into the roof structure. Here, a supporting layer has a through opening reaching to a lower covering layer, wherein the through opening is covered by the lower covering layer, wherein the microphone unit is associated with the through opening and wherein the microphone unit is opposite the lower covering layer with its sound entry region.

12 Claims, 8 Drawing Sheets

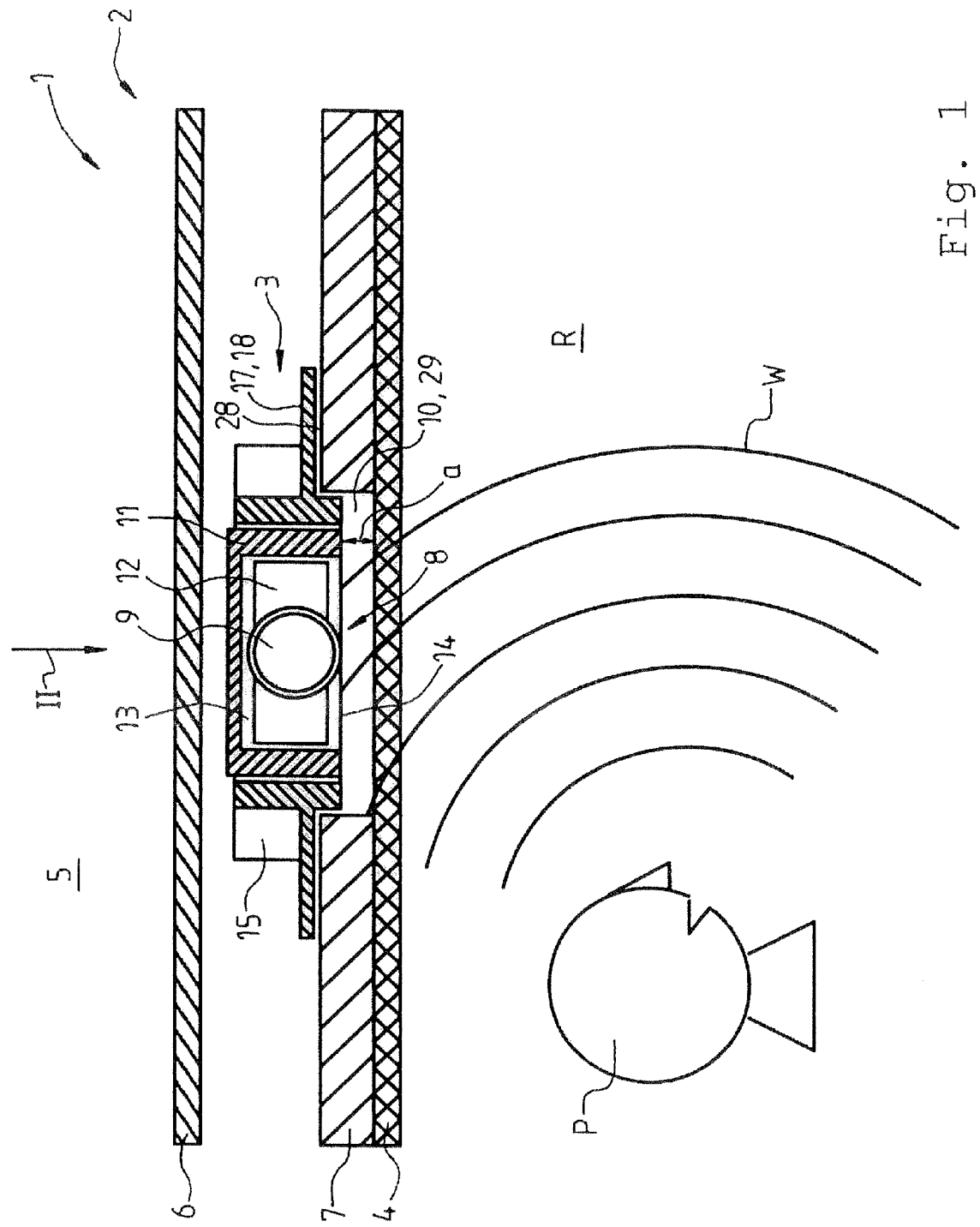

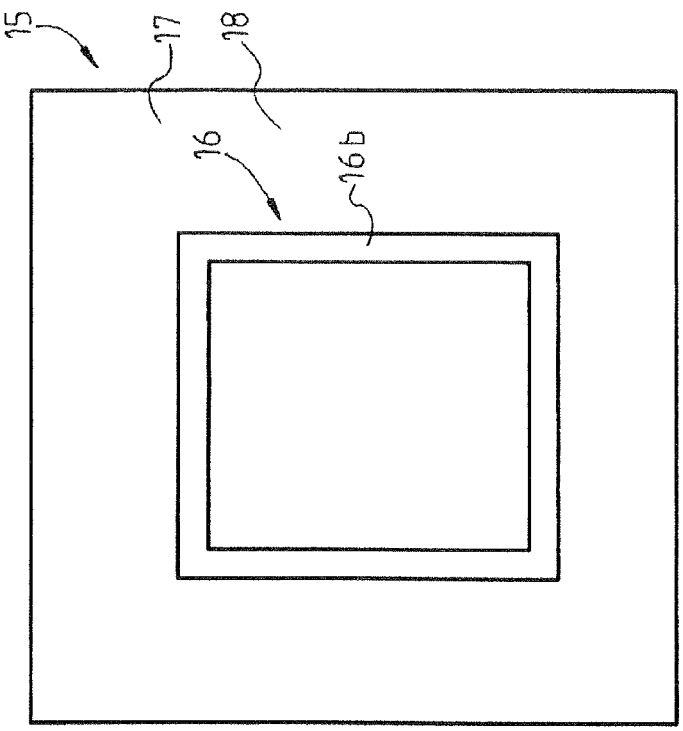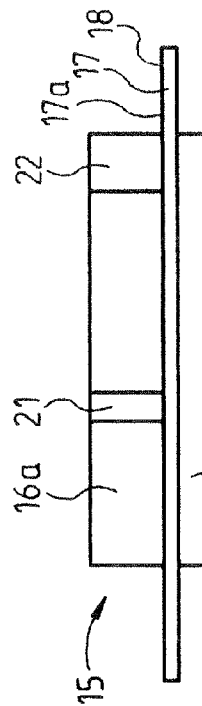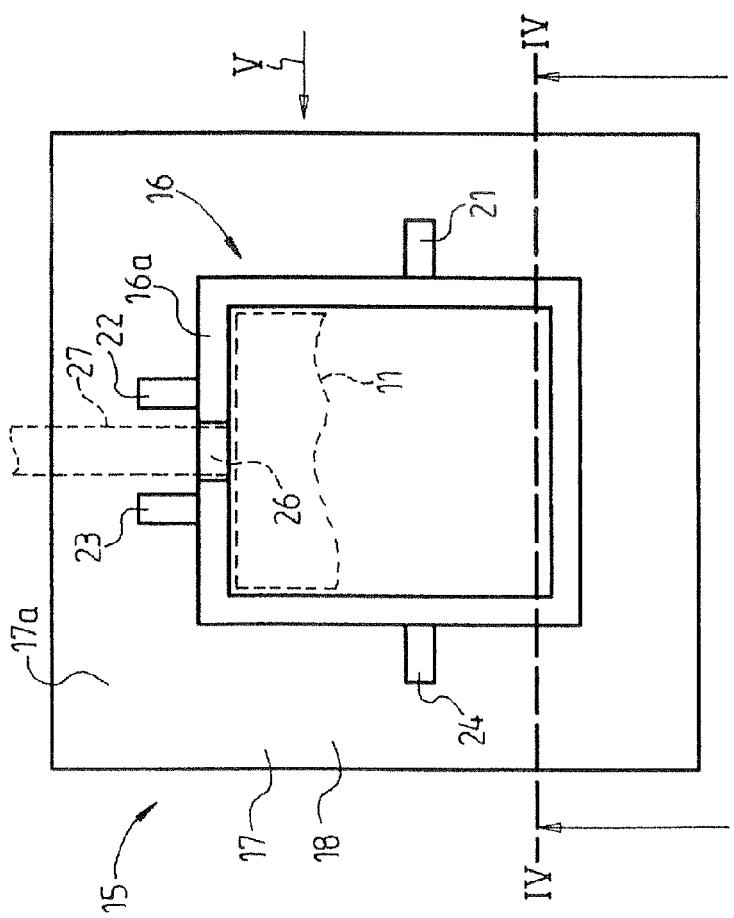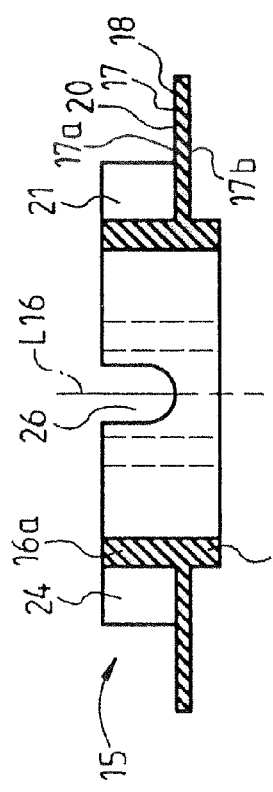

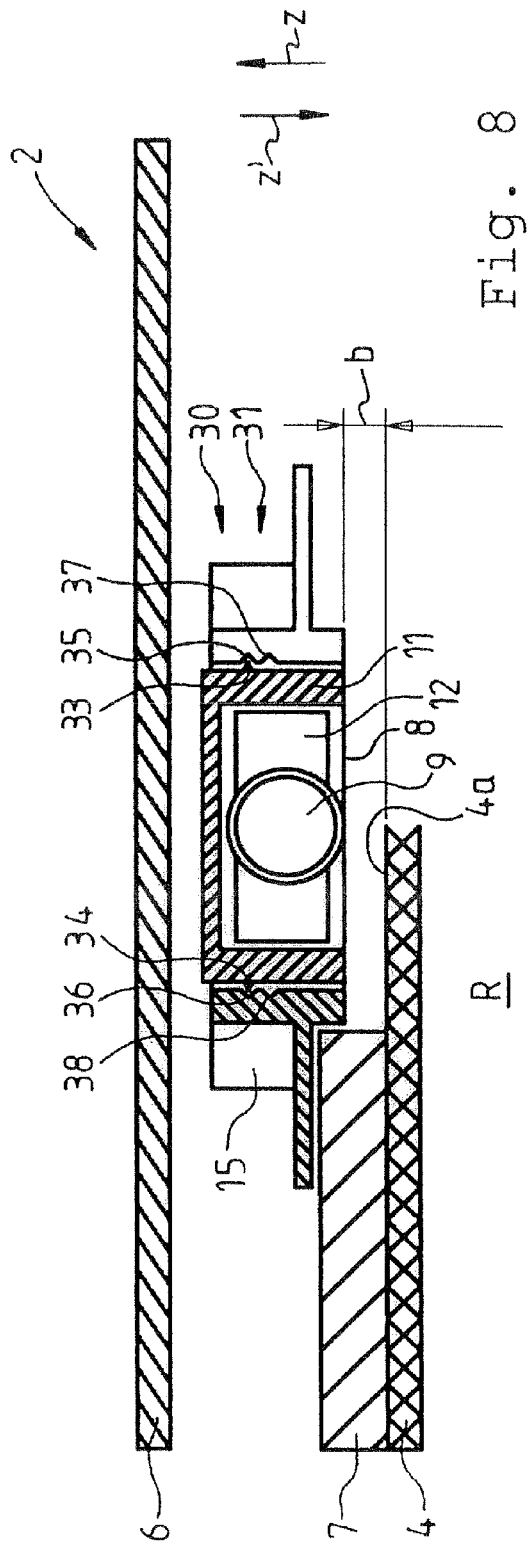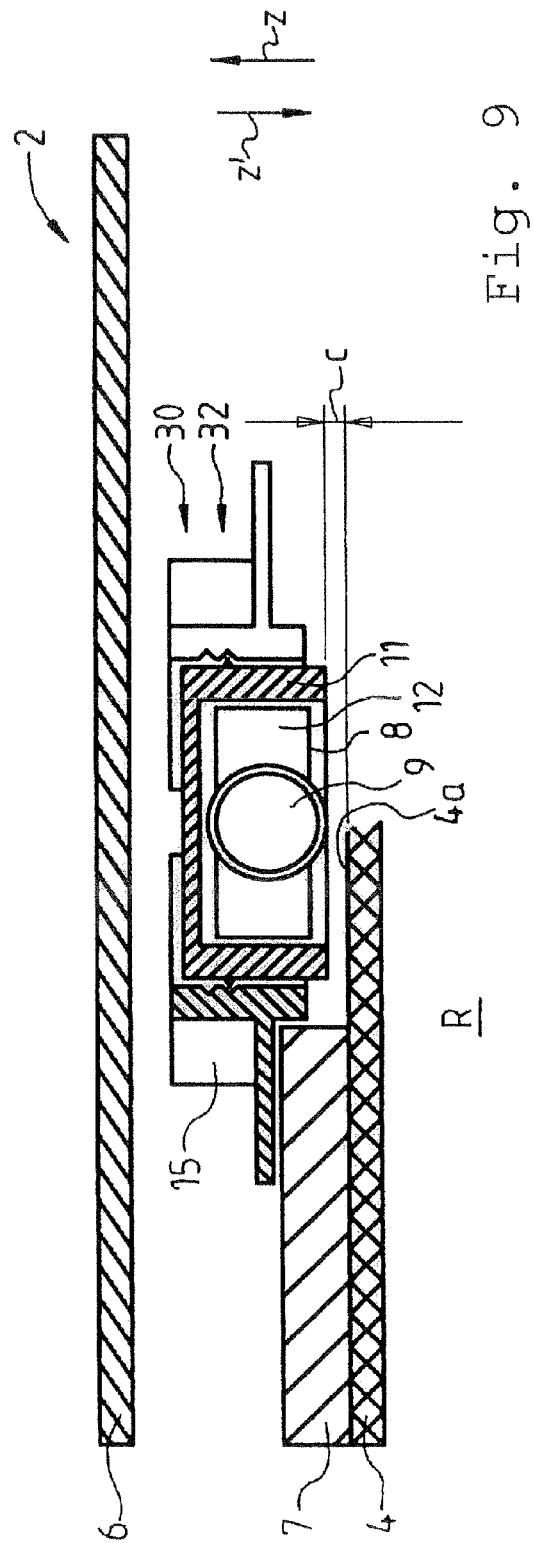

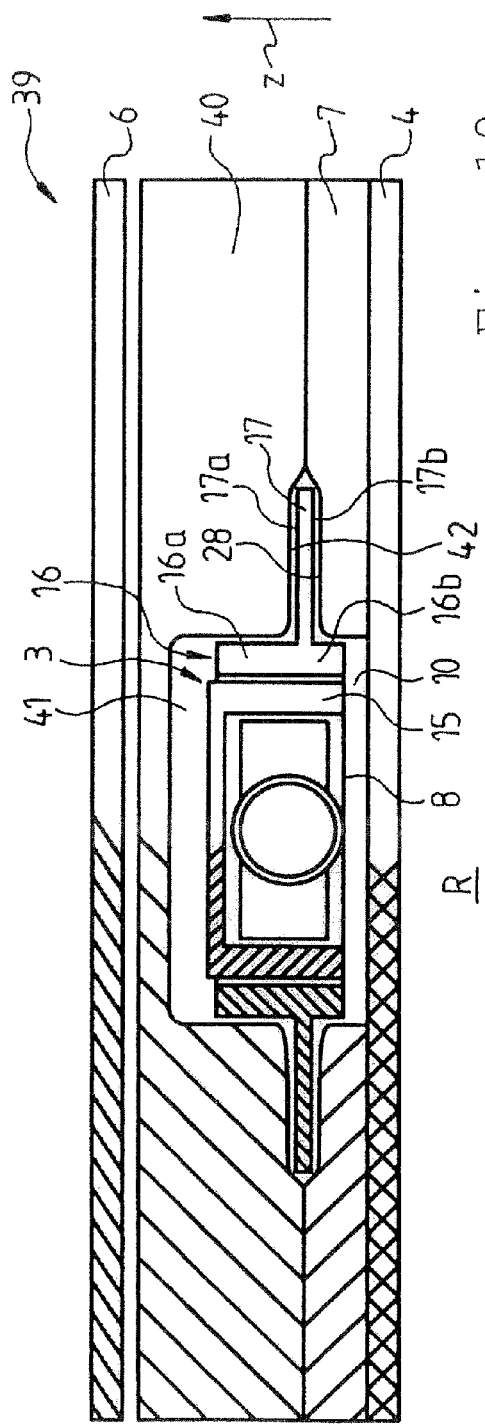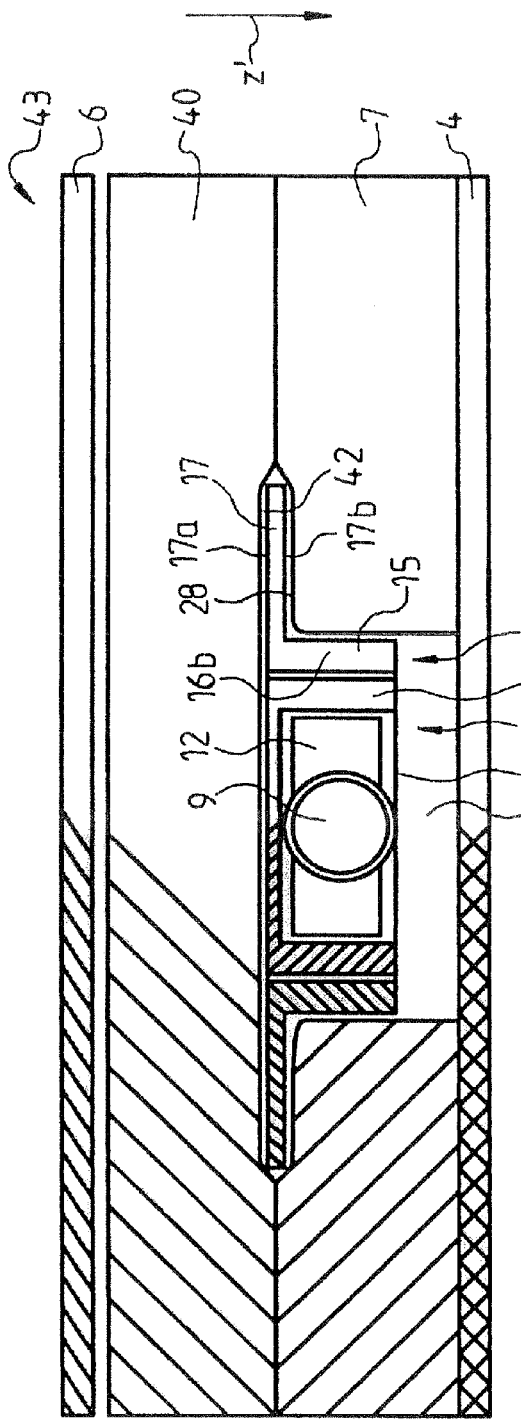

VEHICLE WITH A MULTILAYER ROOF STRUCTURE AND A MICROPHONE UNIT INTEGRATED INTO THE ROOF STRUCTURE

CROSS REFERENCE TO RELATED APPLICATIONS

This application claims the benefit under 35 USC §119(e) of U.S. Provisional Application 61/596,840, filed Feb. 9, 2012, and claims the benefit under 35 USC §119(a)-(d) of German Application No. 10 2012 002 414.2 filed Feb. 9, 2012, the entireties of which are incorporated herein by reference.

FIELD OF THE INVENTION

The present invention relates to a vehicle with a multilayer roof structure and a microphone unit integrated into the roof structure.

BACKGROUND OF THE INVENTION

A vehicle is known from DE 10 2004 019 827 A1, which comprises a multilayer roof structure and a microphone unit integrated into the roof structure, wherein the roof structure comprises a lower covering layer visible from a vehicle interior space, an upper covering layer delimiting the vehicle relative to the surroundings, a supporting layer carrying the lower covering layer and lying between the lower and the upper covering layers, and wherein the microphone unit comprises a sound entry region and at least one microphone. It is disadvantageous in the vehicle disclosed in DE 10 2004 019 827 A1, that the microphone unit is visible to the occupants when the sunshade is folded down and also leads the occupants, as a result of it being visible, to check the microphone unit for a tight fit. By repeated checking of the microphone unit, unwanted damage to the microphone unit can be caused.

SUMMARY OF THE INVENTION

It is an object of the present invention to propose a vehicle in which the microphone unit is integrated into the roof structure so as not to be visible. Furthermore, it is an object of the present invention to propose a microphone unit, which has a high level of insensitivity to wind noise with sensitivity comparable to open microphone units, despite invisible integration into the roof structure.

Finally, it is also an object of the present invention, to ensure high quality mounting of the microphone unit in the roof structure of the vehicle.

With the vehicle according to the present invention, the supporting layer has a through opening extending to the lower covering layer of the roof structure, wherein the through opening is covered by the lower covering layer, wherein the microphone unit is associated with this through opening and wherein the microphone unit has its sound entry region opposite to the lower covering layer. By means of such an arrangement, the microphone unit is not visible to an occupant of the vehicle. Furthermore, the microphone unit has a sensitivity that is comparable to a microphone unit installed so as to be visible, because it is only separated by the lower covering layer of the roof structure from the interior of the vehicle. Compared to a visibly installed microphone unit, the microphone unit arranged in the roof structure is protected against wind-generated interference noise by the lower covering layer providing visual protection. The core of the present invention is thus a special selection of the installation location and the type of installation. As a result of this, the microphone unit is not only arranged discreetly and unobtrusively without the use of additional components, but it has—by the use of the lower covering layer as a filter—a high level of insensitivity to wind noise.

According to the present invention, it is provided that the microphone unit is arranged partially or completely in the through opening of the supporting layer. As a result of this, the installation of a microphone unit is possible without problems, even in vehicles with a thin roof structure.

According to the present invention, the microphone unit comprises, in addition to the microphone mentioned above, a housing and in particular a preamplifier. Here, one side of the housing forms the sound entry region and the microphone unit also comprises in particular a holder for fixing the microphone unit and in particular the housing of the microphone unit. Such a design of the microphone unit facilitates its handling during installation, because the housing, which comprises at least the microphone, can be integrated into the roof structure using the holder with few working steps.

According to the present invention, the holder comprises a shaft, in which the housing of the microphone unit is arranged in the shaft, and the holder also comprises at least one attachment vane arranged on the shaft, wherein in particular the attachment vane lies in a plane in relation to a longitudinal axis of the shaft, which plane is intersected orthogonally by the longitudinal axis, wherein the attachment vane encircles the shaft, especially annularly, wherein an underside of the attachment vane forms a first contact surface, wherein an upper side of the attachment vane forms a second contact surface and wherein the shaft of the holder especially protrudes through the opening in the supporting layer in the mounted state. By a suitable design, the holder forms an adapter, by means of which the housing can be optimally integrated into the roof structure without the housing having to have a special design for this purpose.

With the holder in the assembled state, the present invention provides that the holder rests with the first contact surface on a mating contact surface, which faces the upper covering layer, the mating contact surface being part of the supporting layer of the roof structure. Here the contact surface and the mating contact surface are in particular glued together. As a result of this, the holder or the microphone unit is mounted in the roof structure so as to be vibration-proof and it is ensured that the holder cannot vibrate relative to the roof structure and thus in addition no interference noise can be produced by the holder.

According to the present invention, it is also provided that the roof structure of the vehicle is equipped with an intermediate layer, wherein the intermediate layer is arranged between the supporting layer and the upper covering layer and contacts the supporting layer, wherein the intermediate layer has a recess, in particular facing towards the supporting layer, which is oriented towards the through opening of the supporting layer, wherein the holder is mounted with its attachment vane between the supporting layer and the intermediate layer and contacts the mating contact surface of the supporting layer with the first contact surface of its attachment vane and contacts a mating contact surface of the intermediate layer with the second contact surface of its attachment vane, wherein the holder is optionally clamped with its attachment vane between the supporting layer and the intermediate layer or is glued or clamped to at least one of the layers and glued to at least one layer and wherein the shaft of the holder when in the mounted state especially protrudes into the recess of the intermediate layer. As a result of this, secure fixing of the microphone unit in the roof structure of the vehicle is guaranteed for a roof structure with an intermediate layer.

The present invention provides for the formation of the shaft of the holder by means of a lower flange and/or an upper flange, wherein the two flanges—if provided—merge together in proximity to the attachment vane. As a result of the design as a flange, a particularly simple connection is possible between the housing, which holds the microphone, and the holder. The holder only has to be pushed into the flange for fixing.

The present invention provides a separation of at least 1 mm between the sound entry region of the microphone unit and the lower covering layer, wherein a cavity is formed between the microphone unit and the lower covering layer in the roof structure. As a result of this, the microphone unit does not form an impression on the covering layer that can be seen from the interior of the vehicle. Furthermore, this enables reliable decoupling to be achieved between the microphone and the lower covering layer, because no component of the microphone assembly is in direct contact with the lower covering layer.

According to the present invention, the ability to fix the housing of the microphone unit in the holder of the microphone unit in at least two positions is provided, wherein the sound entry region of the microphone unit has two different distances to the lower covering layer in the first and in the second position. As a result of this, it is possible—in order to achieve an optimal output signal of the microphone—to adapt the position of the sound entry region to the quality of the covering layer or other influencing factors and thus to compensate the influencing factors.

Finally, the present invention provides that the housing can be optionally arranged on the holder in various positions, either fixable by clamping and continuously adjustable or able to be fixed by positive locking and adjustable stepwise. As a result of this, it is possible that the housing and thus also the microphone arranged in the housing can be reliably mounted at a predetermined position in the roof structure of the vehicle.

BRIEF DESCRIPTION OF THE DRAWINGS

Further details of the present invention are described in the drawings with reference to schematically illustrated example embodiments.

FIG. 1 is a schematic, sectional lateral view of a portion of a vehicle with a first variant of a microphone unit;

FIGS. 2-5 illustrate four views of the holder shown in FIG. 1;

FIG. 8 is a section through the roof structure known from FIG. 1 with a second variant of a microphone unit, wherein the housing of the microphone unit is in a first position;

FIG. 9 is an illustration corresponding to FIG. 8, wherein the housing of the microphone unit is in a second position;

FIG. 10 is a section through a second roof structure with a microphone unit known from FIG. 1;

FIG. 11 is a section through a third roof structure with a third microphone unit;

DETAILED DESCRIPTION OF THE INVENTION

Figure 6:
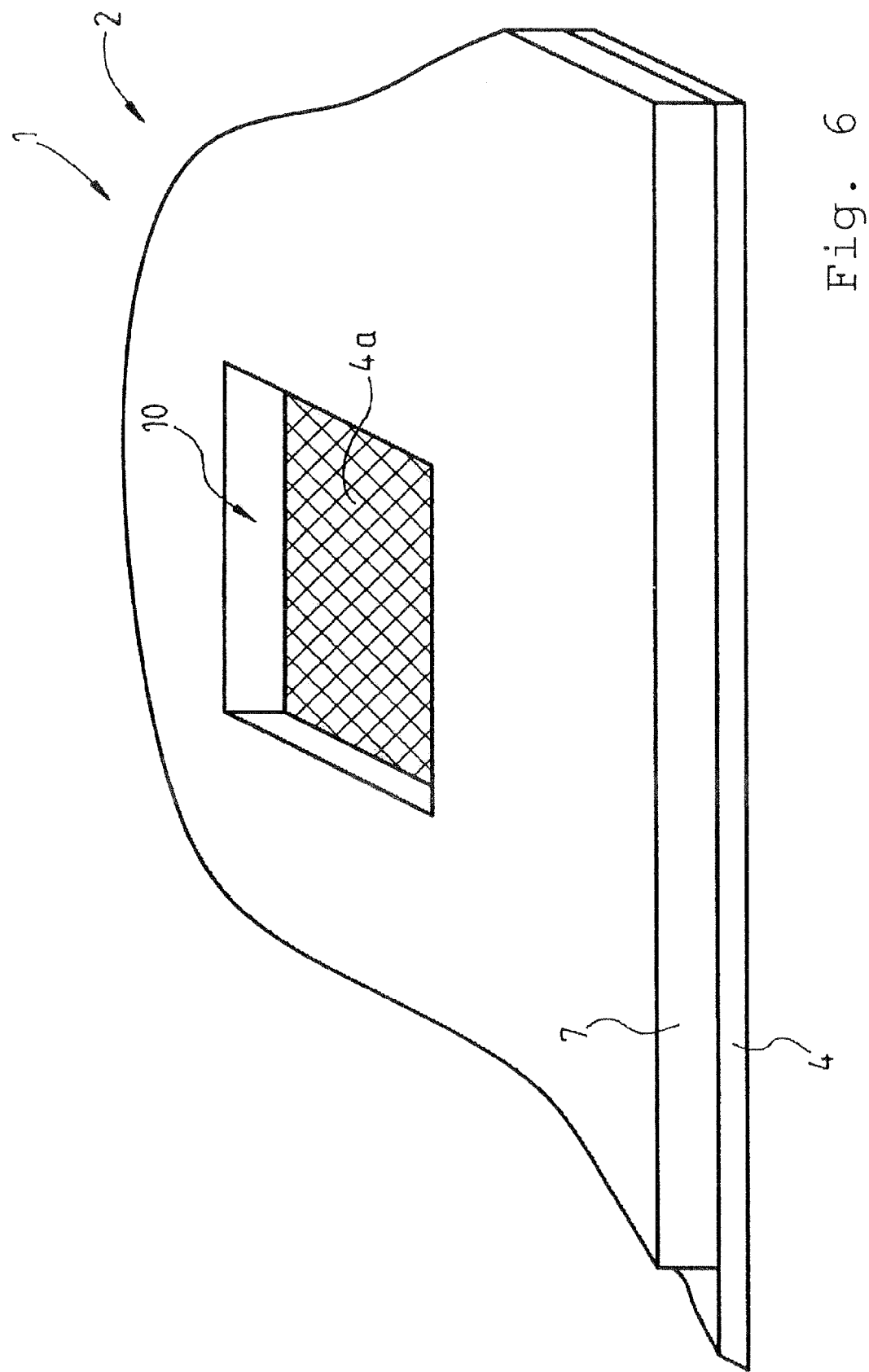
FIG. 6 is a perspective view of a portion of the roof structure shown in FIG. 1.

In FIG. 1, a schematic view of a sectional lateral view of a portion of a motor vehicle 1 is shown. The motor vehicle 1 comprises a multilayer roof structure 2, wherein a microphone unit 3 is integrated into the roof structure 2. The roof structure 2 comprises a lower covering layer 4 that is visible from an interior space R of the vehicle, an upper covering layer 6 delimiting the motor vehicle 1 relative to the surroundings 5, and a supporting layer 7. Here the supporting layer 7 is arranged between the lower covering layer 4 and the upper covering layer 6. The lower covering layer 4 is joined to the supporting layer 7. The microphone unit 3 arranged in the roof structure 2 comprises a sound entry region 8 and a microphone 9. For receiving the microphone unit 3 into the roof structure 2, the supporting layer 7 has a through opening 10, wherein the through opening 10 reaches to the lower covering layer 4. The through opening 10 is closed to the interior of the vehicle R by the lower covering layer 4. The microphone unit 3 is associated with the through opening 10. An association of the microphone unit 3 with the through opening 10 takes place in such a way that the sound entry region 8 of the microphone unit 3 is enclosed by the lower covering layer 4.

In FIG. 6, the lower covering layer 4 and the supporting layer 7 are shown in a perspective illustration. In the supporting layer 7, the through opening 10 can be clearly identified, which allows the view to an upper side 4a of the lower covering layer 4. Here the through opening 10 is in the form of a square cut-out. Other cut-out geometries may also be used, such as circular, oval or the like, within the scope of the present invention.

The microphone unit 3 shown in FIG. 1 comprises a housing 11 and a preamplifier 12 in addition to the already mentioned microphone 9. Here the microphone 9 and the preamplifier 12 are arranged in an accommodation space 13 of the housing 11. A side 14 of the housing 11 facing downwards to the interior of the vehicle R forms the sound entry region 8. The microphone unit 3 also comprises a holder 15, with which the housing 11 of the microphone unit 3 is fixed in the roof structure 2. The holder 15 shown in FIG. 1 is also shown in the illustrations of FIGS. 2 to 5 and 7. Sound waves W, which emanate from a vehicle occupant P, for example, when they utter a voice command, pass through the covering layer 4 and enter the microphone unit 3 in the sound entry region 8.

In FIG. 2, the holder 15 is shown in plan view from an arrow direction II indicated in FIG. 1. The holder 15 comprises a shaft 16, in which the housing 11 is accommodated (see FIG. 1). The holder 15 also comprises an attachment vane 17. This attachment vane 17 is orthogonally intersected by a longitudinal axis L16 of the shaft 16 (see FIG. 4) and forms a ring 18, which encircles the shaft 16. An underside 17b of the vane 17 forms a first contact surface 19 and an upper side 17a of the attachment vane 17 forms a second contact surface 20 (see FIG. 4). The shaft 16 of the holder 15 is essentially formed by a lower flange 16b and an upper flange 16a. Here the lower flange 16b is formed underneath the attachment vane 17 and the upper flange 16a is formed above the attachment vane 17. The holder 15 is strengthened by the inclusion of one or more strengthening ribs. For example, in FIG. 2 the holder 15 is strengthened by 4 strengthening ribs 21 to 24, wherein these are formed between the upper side 17a of the attachment vane 17 and the upper flange 16a. In proximity to its upper flange 16a, the shaft 16 comprises a cutout 26. A cable 27 led through this cutout 26 connects the microphone 9 arranged in the housing 11 and a preamplifier unit 12 arranged in the housing 11 to non-illustrated vehicle electronics. For explanation, the housing 11 and the cable 27 are illustrated in FIG. 2 with dashed lines.

In FIG. 3, the holder 15 shown in FIG. 2 is illustrated in a view from below. The already mentioned FIG. 4 shows a section through the holder 15 shown in FIG. 2 corresponding to the sectional line IV-IV and FIG. 5 shows a lateral view of the holder 15 illustrated in FIG. 2 from the arrow direction V.

Figure 7:
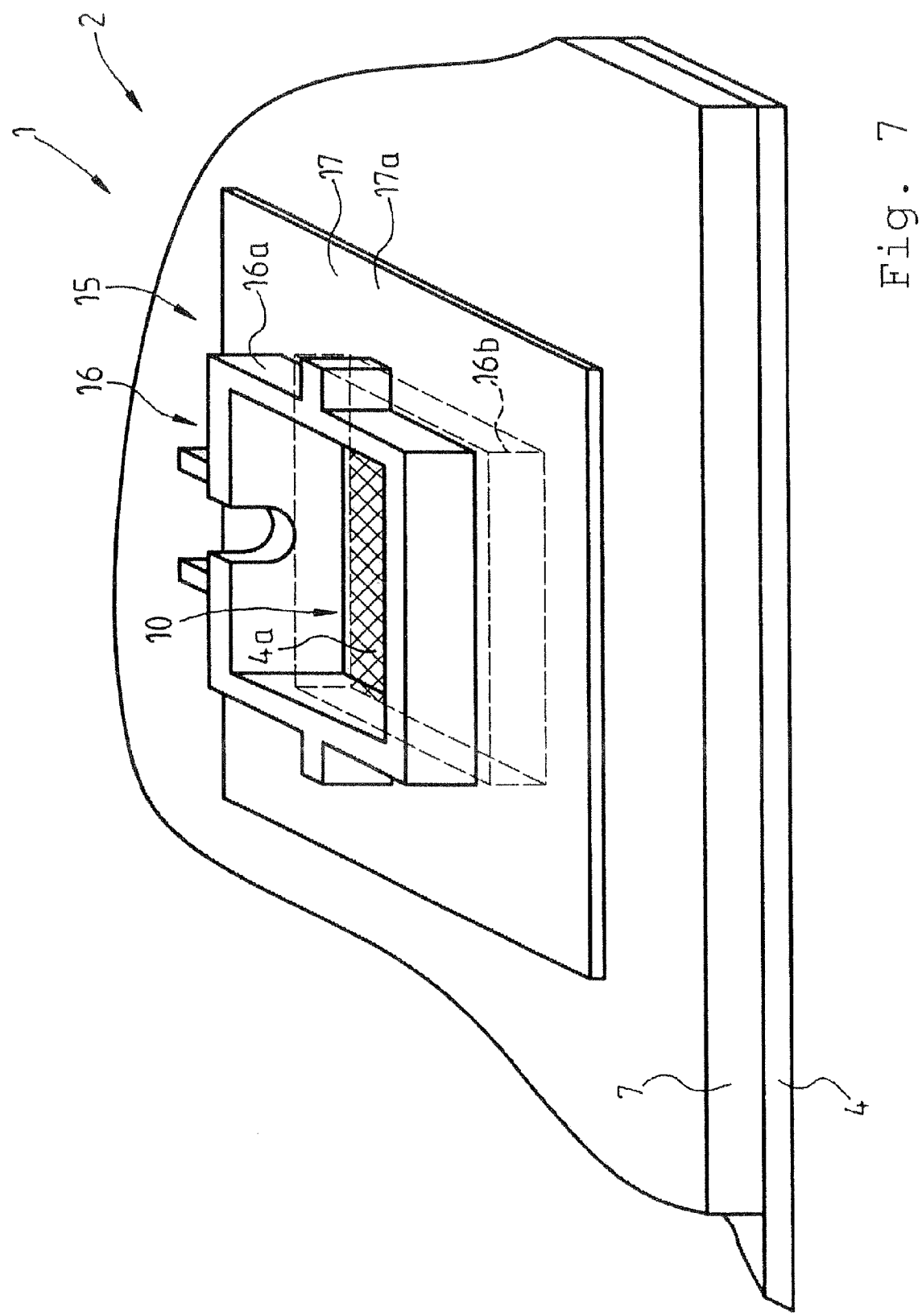
FIG. 7 is a perspective view of a portion of the roof structure shown in FIG. 1 with a holder inserted.

In FIG. 7, it is shown in a perspective view how the holder 15, with the lower flange 16b of its shaft 16 illustrated with dashed lines, is inserted in the through opening 10 of the supporting layer 7. It can be seen from FIGS. 1 and 7 that the microphone unit 3 is only partially arranged, i.e. by about only a quarter, in the through opening 10 of the supporting layer 7. In the fully mounted state—as shown in FIG. 1—the holder 15 rests with the underside 17b of its attachment vane 17 on a mating contact surface 28 of the supporting layer 7, which faces towards the upper covering layer 6 of the roof structure 2. The underside 17b of the attachment vane 17 and the mating contact surface 28 of the supporting layer 7 are glued together. The sound entry region 8 of the microphone unit 3 is at a distance a from the lower covering layer 4. For example, in FIG. 7, the magnitude of the distance is approximately 2 mm. A cavity 29 is thus formed between the microphone unit 3 and the lower covering layer 4.

FIGS. 8 and 9 show the roof structure 2, which is known from FIG. 1, of a vehicle 1 with a lower covering layer 4, an upper covering layer 6 and a supporting layer 7 as well as a second variant of a microphone unit 30. A housing 11 of the microphone unit 30 can be fixed relative to a holder 15 of the microphone unit 30 in a first position 31 (see FIG. 8) and in a second position 32 (see FIG. 9). Here a sound entry region 8 of the housing 11 is at a distance b from an upper side 4a of the lower covering layer 4 in the first position 31 and here the sound entry region 8 of the housing 11 is at a distance c from the upper side 4a of the lower covering layer 4 in the second position 32. The distance c is smaller than the distance b. A change of the distance takes place in that the housing 11, which accommodates a microphone 9 and a preamplifier 12, can be displaced relative to the holder 15 glued in the roof structure 2 in a fixed manner from position 31 in the direction of an arrow z' downwards towards a motor vehicle interior space R into position 32. A corresponding displacement takes place in stages, because the holder 15 with latching protrusions 33, 34 can be optionally latched into recesses 35, 36 or 37, 38. Here the sectioned housing 11 is only hatched on its left side, in order to make the latching protrusions 35 and the recesses 35, 37 easier to identify.

According to a non-illustrated variant, it is also provided that the housing is fixed in the holder by clamping and as a result that continuous adjustability is achieved.

Figure 12:
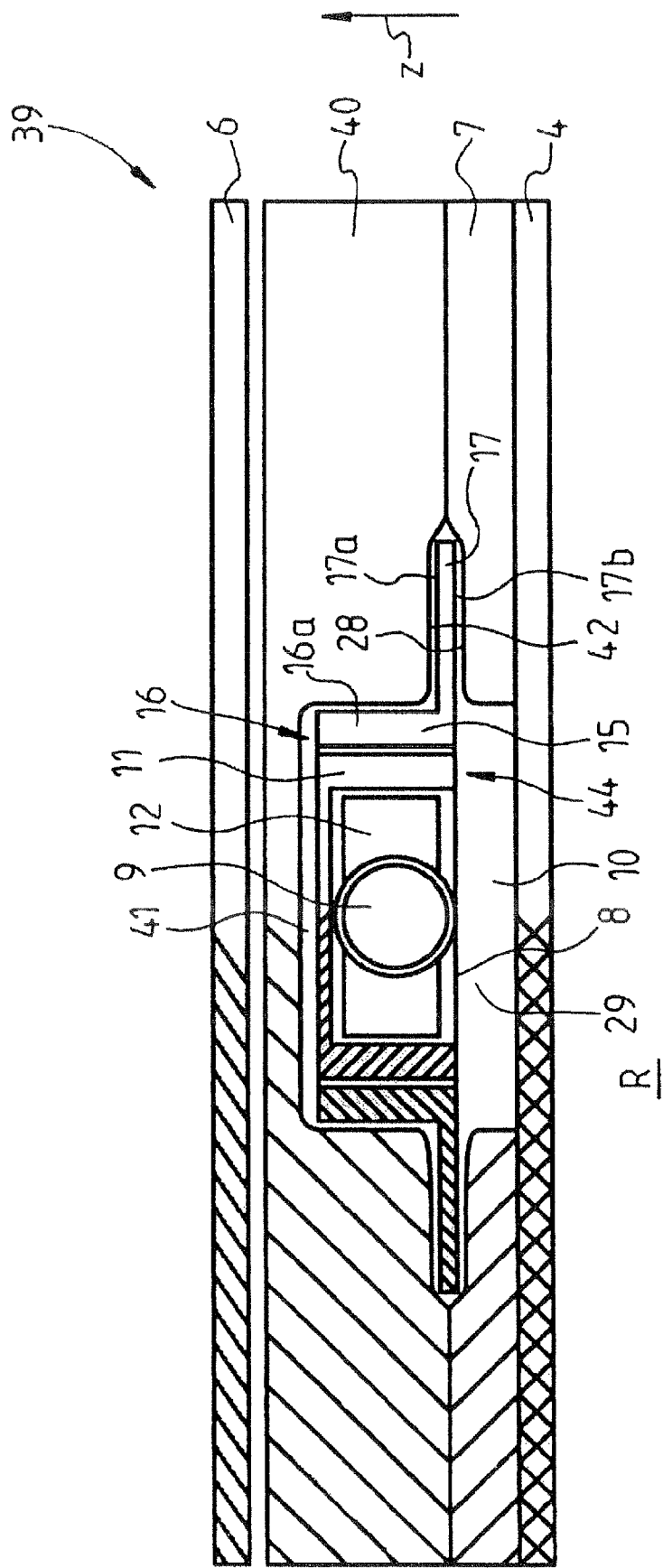
FIG. 12 is a section through a second roof structure known from FIG. 10 with a microphone unit known from FIG. 3.

In FIGS. 10 to 12, other variants are illustrated, wherein these are each only half hatched in order to facilitate a description with reference numerals. In FIG. 10, a third variant is shown, for which a second roof structure 39 comes into use, which comprises an intermediate layer 40 in addition to a lower covering layer 4, an upper covering layer 6 and a supporting layer 7. Here the intermediate layer 40 is arranged between the supporting layer 7 and the upper covering layer 6 and contacts the supporting layer 7. A microphone unit 3 is designed according to the microphone unit known from FIGS. 1 to 7. With respect to the details of the microphone unit 3, explicit reference is made to the description for FIGS. 1 to 7. For accommodating the microphone unit 3, the intermediate layer 40 has a recess 41 facing towards the supporting layer 7. Here the recess 41 is oriented towards a through opening 10 in the supporting layer 7. For fixing the microphone unit 3, the holder 15 with its attachment vane 17 is held between the supporting layer 7 and the intermediate layer 40. For this purpose, the attachment vane 17 contacts a mating contact surface 28 of the supporting layer 7 with its underside 17b and for this purpose the attachment vane 17 contacts a mating contact surface 42 of the intermediate layer 40 with its upper side 17a. The shaft 16 of the holder 15 protrudes with its upper flange 16a in the direction of arrow z into the recess 41 of the intermediate layer 40. Thus, the microphone unit 3 is wholly accommodated within the two layers 7 and 40, which are in contact with each other, and is oriented with its sound entry region 8 towards an interior space of the vehicle R or towards the lower covering layer 4, wherein the sound entry region 8 is oriented parallel to the lower covering layer 4 covering the through opening 10 in supporting layer 7.

In FIG. 11 a fourth variant is shown, with which a third roof structure 43 is used, which comprises a lower covering layer 4, an upper covering layer 6, a supporting layer 7 and an intermediate layer 40. Here the intermediate layer 40 is arranged between the supporting layer 7 and the upper covering layer 6 and contacts the supporting layer 7. A microphone unit 44 comprises a microphone 9, a sound entry region 8, a preamplifier 12, a housing 11 and a holder 15. For fixing the microphone unit 44, the holder 15 is mounted with its attachment vane 17 between the supporting layer 7 and the intermediate layer 40. For this purpose, the attachment vane 17 contacts a mating contact surface 28 of the supporting layer 7 with its underside 17b and for this purpose the attachment vane 17 contacts a mating contact surface 42 of the intermediate layer 40 with its upper side 17a. A shaft 16 of the holder 15 is only formed by a lower flange 16b and protrudes in the direction of the arrow z' into a through opening 10 of the supporting layer 7. Thus, the microphone unit 44 is wholly accommodated within the supporting layer 7 and is oriented with its sound entry region 8 towards an interior space of the vehicle R or towards the lower covering layer 4, wherein the sound entry region 8 is oriented parallel to the lower covering layer 4 covering the through opening 10 in supporting layer 7.

In FIG. 12, a fifth variant is shown, in which a roof structure 39 is used, which is already known from FIG. 10 and which comprises a lower covering layer 4, an upper covering layer 6, a supporting layer 7 and an intermediate layer 40. Here the intermediate layer 40 is arranged between the supporting layer 7 and the upper covering layer 6 and contacts the supporting layer 7. A microphone unit 44 corresponds to the microphone unit shown in FIG. 11 and comprises a microphone 9, a sound entry region 8, a preamplifier 12, a housing 11 and a holder 15. Here the holder 15 and the housing 11 are combined, which is different from the illustration of FIG. 11, in such a way that the holder 15 is turned through 180° and the sound entry region 8 of the housing 11 lies in a common plane with an underside 17b of an attachment vane 17 of the holder 15 facing towards the lower covering layer. For fixing the microphone unit 44, the holder 15 is held with its attachment vane 17 between the supporting layer 7 and the intermediate layer 40. For this purpose the attachment vane 17 has its underside 17b in contact with a mating contact surface 28 of the supporting layer 7 and for this purpose the attachment vane 17 has its upper side 17a in contact with a mating contact surface 42 of the intermediate layer 40. A shaft 16 of the holder 15 is only formed by an upper flange 16a and protrudes in the direction of the arrow z into a recess 41 of the intermediate layer 40. A through opening 10 of the supporting layer 7 forms a cavity 29 below the sound entry region 8. Thus the microphone unit 44 is fully accommodated within the intermediate layer 40 and is oriented with its sound entry region 8 towards an interior space of the vehicle R or towards the lower covering layer 4, wherein the sound entry region 8 is oriented parallel to the lower covering layer 4 covering the through opening 10 in supporting layer 7.

Figure 13:
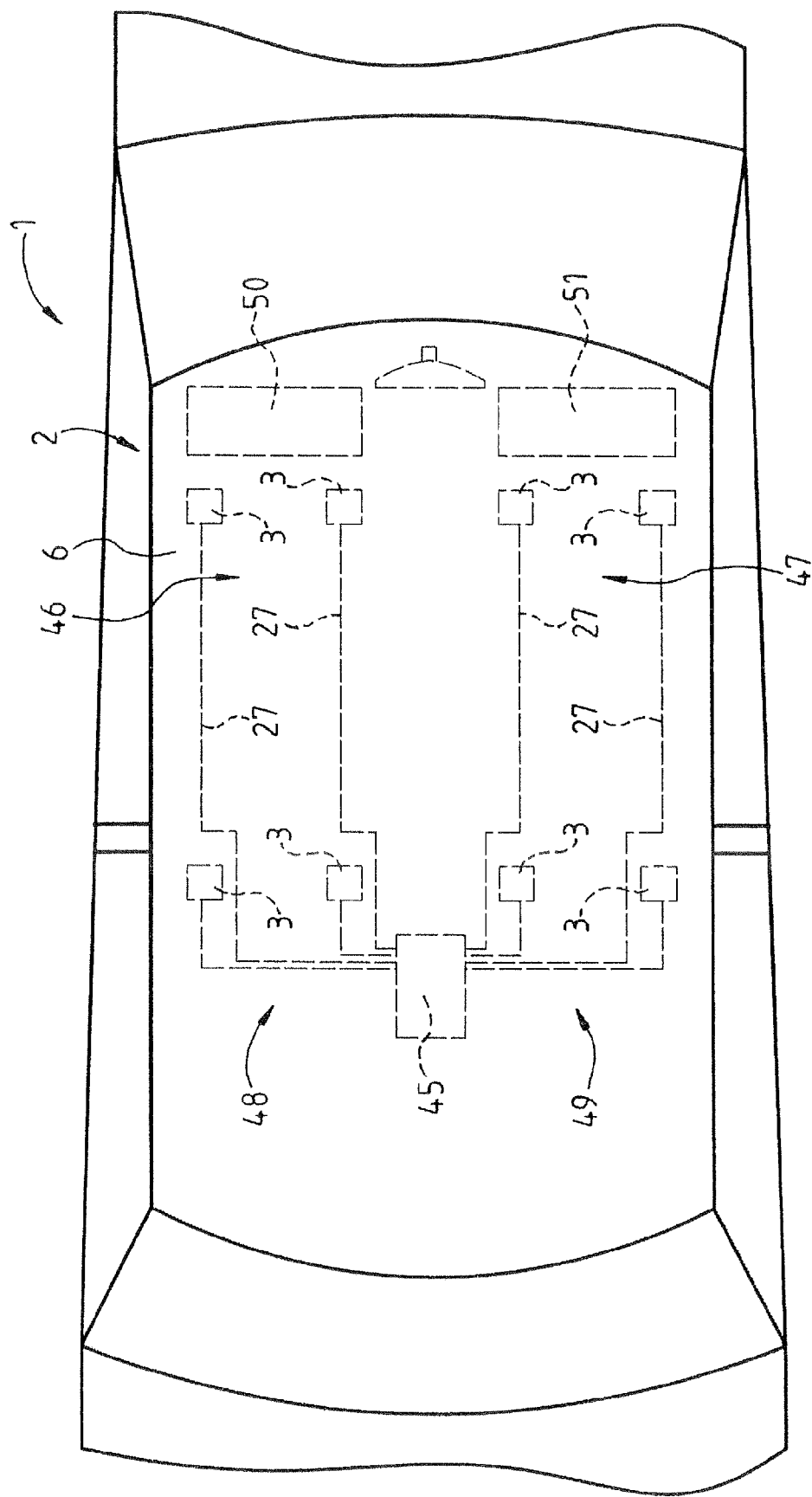
FIG. 13 is a plan view of a vehicle.

In FIG. 13, a plan view of a large portion of the vehicle 1 mentioned in FIG. 1 is shown. In the roof structure 2 of the vehicle 1, eight microphone units 3 are arranged, which are designed according to FIGS. 1 to 7 and are integrated into the roof structure 2. In FIG. 13, these microphone units 3 are only schematically indicated by rectangles, which are below the upper covering layer 6 of the roof structure 2. The individual microphone units 3 are connected by the cables 27 mentioned to an electronics unit 45 arranged in the roof structure 2 and integrated by it into a vehicle electronic system. Here, in each case, two microphone units 3 are associated with a driver's seat 46, a passenger's seat 47 and rear seats 48, 49 of the vehicle 1. The microphone units 3 associated with the driver's seat 46 and the passenger's seat 47 are located in proximity to the sunshades 50, 51.

The present invention is not limited to the illustrated or described example embodiments. Rather, it comprises developments of the present invention within the scope of the patent claims.

REFERENCE NUMERALS 1 vehicle
2 first roof structure
3 first microphone unit
4 lower covering layer
4*a* upper side of 4
5 surroundings of motor vehicle
6 upper covering layer
7 supporting layer
8 sound entry region
9 microphone
10 through opening in 7
11 housing
12 preamplifier
13 accommodation space of 11
14 side of 11
15 holder
16 shaft
16*a* upper flange
16*b* lower flange
17 attachment vane
17*a* upper side of 17
17*b* lower side of 17
18 ring
19 contact surface formed by 17*b*
20 contact surface formed by 17*a*
21-25 strengthening ribs between 17*a* and 16*a*
26 cutout on 16
27 cable
28 mating contact surface of 7
29 cavity between 8 and 4
30 second microphone unit
31 first position of 30
32 second position of 30
33, 34 latching protrusion on 11
35, 36 recess on 16
37, 38 recess on 16
39 second roof structure
40 intermediate layer
41 recess
42 mating contact surface of 40
43 third roof structure
44 third microphone unit
45 electronics unit
46 driver's seat
47 passenger's seat
48, 49 passenger's seat
50, 51 sunshade
L16 longitudinal axis of 16
P vehicle occupant
R internal vehicle space
W sound waves
a,b,c distance between 8 and 4
z, z' direction

I claim:

1. A vehicle having a multilayer roof structure and a microphone unit integrated into the roof structure,
   wherein the roof structure comprises a lower covering layer visible from an interior space of the vehicle, an upper covering layer delimiting the vehicle relative to its surroundings, and a supporting layer,
   wherein the supporting layer is arranged between the lower covering layer and the upper covering layer,
   wherein the supporting layer supports the lower covering layer,
   wherein the microphone unit comprises a sound entry region and at least one microphone,
   wherein the supporting layer has a through opening reaching to the lower covering layer,
   wherein the through opening is covered by the lower covering layer,
   wherein the microphone unit is associated with said through opening,
   wherein the microphone unit is opposite the lower covering layer with its sound entry region,
   wherein the microphone unit further comprises a housing and a preamplifier,
   wherein one side of the housing forms the sound entry region,
   wherein the microphone unit also comprises a holder for fixing the microphone unit,
   wherein the holder fixes the housing of the microphone unit,
   wherein the holder comprises a shaft,
   wherein the housing of the microphone unit is arranged in the shaft,
   wherein the holder comprises at least one attachment vane arranged on the shaft,
   wherein the attachment vane lies in a plane, which is intersected orthogonally by a longitudinal axis of the shaft,
   wherein the attachment vane encloses the shaft annularly,
   wherein an underside of the attachment vane forms a first contact surface,
   wherein an upper side of the attachment vane forms a second contact surface,
   wherein the shaft of the holder protrudes into the through opening of the supporting layer in a mounted state, and
   wherein one or more ribs protrude from an external surface of the holder and are in contact with the upper side of the attachment vane.

2. The vehicle according to claim 1, wherein the microphone unit is at least partially arranged in the through opening of the supporting layer.

3. The vehicle according to claim 2, wherein the microphone unit is completely arranged in the through opening of the supporting layer.

4. The vehicle according to claim 1, wherein in the mounted state, the holder with the first contact surface is in contact with a mating contact surface of the supporting layer of the roof structure.

5. The vehicle according to claim 4, wherein the first contact surface is glued to the mating contact surface.

6. The vehicle according to claim 1, wherein the shaft of the holder is formed by a lower flange and an upper flange, wherein the two flanges merge together in proximity to the attachment vane.

7. The vehicle according to claim 1, wherein the sound entry region of the microphone unit is at a distance from the lower covering layer of at least 1 mm and wherein a cavity is formed between the microphone unit and the lower covering layer.

8. The vehicle according to claim 1,
wherein the housing can be fixed in the holder in at least two positions,
wherein the sound entry region of the microphone unit in a first position is at a distance (b) from the lower covering layer,
wherein the sound entry region of the microphone unit in a second position is at a distance (c) from the lower covering layer and
wherein distance (c) is smaller than distance (b).

9. The vehicle according to claim 8, wherein the housing can be fixed to the holder in the at least two positions by one of clamping so that a position of the housing is continuously adjustable and positive locking so that the position of the housing is adjustable in steps.

10. A vehicle having a multilayer roof structure and a microphone unit integrated into the roof structure,
wherein the roof structure comprises a lower covering layer visible from an interior space of the vehicle, an upper covering layer delimiting the vehicle relative to its surroundings, and a supporting layer,
wherein the supporting layer is arranged between the lower covering layer and the upper covering layer,
wherein the supporting layer supports the lower covering layer, and
wherein the microphone unit comprises a sound entry region, at least one microphone, a holder for fixing the microphone unit and at least one attachment vane,
wherein the supporting layer has a through opening reaching to the lower covering layer,
wherein the through opening is covered by the lower covering layer,
wherein the microphone unit is associated with said through opening,
wherein the microphone unit is opposite the lower covering layer with the sound entry region at a predetermined distance above the lower covering layer,
wherein the holder comprises a shaft and the at least one attachment vane is arranged on the shaft,
wherein the roof structure of the vehicle further comprises an intermediate layer,
wherein the intermediate layer is arranged between the supporting layer and the upper covering layer and contacts the supporting layer,
wherein the intermediate layer has a recess in a lower surface thereof that is aligned with the through opening of the supporting layer,
wherein the holder is held with the at least one attachment vane between the supporting layer and the intermediate layer and contacts a mating contact surface of the supporting layer with a first contact surface of the at least one attachment vane and contacts a mating contact surface of the intermediate layer with a second contact surface of the at least one attachment vane,
wherein the holder, with the at least one attachment vane between the supporting layer and the intermediate layer, is at least one of clamped and glued to at least one of the layers, and
wherein in a mounted state the shaft of the holder protrudes into the recess of the intermediate layer.

11. The vehicle according to claim 10,
wherein the housing can be fixed in the holder in at least two positions,
wherein the sound entry region of the microphone unit in a first position is at a distance (b) from the lower covering layer,
wherein the sound entry region of the microphone unit in a second position is at a distance (c) from the lower covering layer; and
wherein distance (c) is smaller than distance (b).

12. The vehicle according to claim 11, wherein the housing can be fixed to the holder in the at least two positions by one of clamping so that a position of the housing is continuously adjustable and positive locking so that the position of the housing is adjustable in steps.

* * * * *